(12) United States Patent
Zeng et al.

(10) Patent No.: US 6,658,162 B1
(45) Date of Patent: Dec. 2, 2003

(54) IMAGE CODING METHOD USING VISUAL OPTIMIZATION

(75) Inventors: Wenjun Zeng, Vancouver, WA (US); Shawmin Lei, Camas, WA (US); Scott Daly, Kalama, WA (US)

(73) Assignee: Sharp Laboratories of America, Camas, WA (US)

( * ) Notice: Subject to any disclaimer, the term of this patent is extended or adjusted under 35 U.S.C. 154(b) by 0 days.

(21) Appl. No.: 09/417,873

(22) Filed: Oct. 13, 1999

Related U.S. Application Data

(60) Provisional application No. 60/141,642, filed on Jun. 26, 1999.

(51) Int. Cl.[7] ................................................ G06K 9/46
(52) U.S. Cl. ................. 382/251; 382/240; 382/248; 382/250; 358/539
(58) Field of Search ..................... 382/166, 232–233, 382/239, 248, 250, 251, 240; 358/539, 426.15; 375/240.01, 240.24, 240.12, 240.25, 240.14, 240.02, 240.18, 240.19, 240.2; 348/406.1, 396.1

(56) References Cited

U.S. PATENT DOCUMENTS

| | | | |
|---|---|---|---|
| 4,725,885 A | 2/1988 | Gonzales et al. | 375/240.14 |
| 4,774,574 A | 9/1988 | Daly et al. | 348/406.1 |
| 5,079,621 A * | 1/1992 | Daly et al. | 348/396.1 |
| 5,136,377 A | 8/1992 | Johnston et al. | 375/240.12 |
| 5,313,298 A | 5/1994 | Meeker | 375/240.01 |
| 5,426,512 A * | 6/1995 | Watson | 382/250 |
| 5,629,780 A | 5/1997 | Watson | 382/250 |
| 6,411,740 B1 * | 6/2002 | Daly | 382/251 |

OTHER PUBLICATIONS

Watson, et al. *Visibility of Wavelet Quantizatio Noise, IEEE Transctions on Image Processing*, vol. 6, No. 8, pp. 1164–1175, 1997.

Daly, S. *Application of a Noise–Adaptive Contrast Sensitivity Function to Image Data Compression, Optical Engineering*, vol. 29, pp. 977–987, Aug. 1990.

Hontsch, et al. *APIC: Adaptive Perceptual Image Coding Based on Subband Decomposition with Locally Adaptive Perceptual Weighting, Proceedings of the IEEE International Conference on Image Processing*, pp. 37–40, 1997.

Taubman, D. *High Performance Scalable Image Compression with EBCOT*, Jun. 16, 1999, http://maestro.ee.unsw.edu.au/~taubman/activities/activities.html.

* cited by examiner

Primary Examiner—Leo Boudreau
Assistant Examiner—Ishrat Sherali
(74) Attorney, Agent, or Firm—Marger Johnson & McCollom

(57) ABSTRACT

A method for compressing and decompressing image information. An encoder receives initial image information and transforms said initial information using a linear transform to produce coefficients. These are then locally normalized using a neighborhood masking weighting factor, quantized and coded to result in a compressed bit stream. The compressed bit stream is received at a decoder and an inverse process is applied to reconstruct said image data from the compressed bitstream. Alternatively, the neighborhood-masking factor can be applied after quantization in the rate-distortion optimization process.

10 Claims, 3 Drawing Sheets

IMAGE CODING METHOD USING VISUAL OPTIMIZATION

BACKGROUND OF THE INVENTION

This application claims priority to U.S. Provisional Patent Application No. 60/141,642, filed Jun. 26, 1999.

FIELD OF THE INVENTION

This invention relates to method for coding images, more particularly to methods for image coding that use visual optimization techniques of self-contrast and neighborhood masking.

BACKGROUND OF THE INVENTION

Image compression involves coding image information in such a manner that the amount of data required to reconstruct the image is compressed. When the image information is transmitted, not as much bandwidth is required to transmit the image when it is compressed. The compression of images is typically referred to as image coding. The reconstruction is typically referred to as decoding.

Image compression has as one of its goals the removal of statistical redundancy in the image data. Redundancy leads to increased bandwidth. Compression techniques try to minimize the distortion of the image within a given transmission bit rate, and minimize the bit rate when given an allowable distortion target.

Another goal of image compression focuses on removing perceptual irrelevancy. Aspects of the image that cannot be detected by the human visual system are irrelevant. Therefore, it wastes resources and bandwidth to compress in such a manner to include these aspects. Compression schemes should take into account properties of the human visual system in the process of optimizing the coding.

One common visual optimization strategy for compression makes use of the contrast sensitivity function of the visual system. Human eyes are less sensitive to high frequency errors, meaning that high frequency components of images can be more coarsely quantized. DCT and wavelet based compression systems use this strategy widely, as demonstrated in U.S. Pat. No. 5,629,780, issued May 13, 1997; S. Daly, Application of a Noise-Adaptive Contrast Sensitivity Function to Image Data Compression, *Optical Engineering*, vol. 29, pp. 977–987, 1990; Watson, et al., Visibility of Wavelet Quantization Noise, *IEEE Transactions on Image Processing*, vol. 6, no. 8, pp. 1164–1175, 1997.

The advantages of this technique become less noticeable for lower is resolution display and closer viewing distance. The contrast sensitivity function curve (CSF) tends to be flat in those conditions, not allowing the high frequency content to be more coarsely quantized without affecting the perception.

Another perceptual phenomenon occurs in an effect called visual masking. Images acting as background signals mask artifacts locally. For example, in the wavelet transform domain a larger coefficient can tolerate a larger distortion than smaller coefficients. This occurs because the large coefficient has a larger background signal that masks the visual distortion.

U.S. Pat. No. 5,136,377, issued Aug. 4, 1992, and U.S. Pat. No. 4,725,885, issued Feb. 16, 1988, show early work with this phenomenon. These attempts basically tried to scale the overall quantization values as a function of local image variance. These methods require processing overhead to notify the decoder what quantizer encoded a local block.

One example of these techniques, found in U.S. Pat. No. 4,774,574, issued 1988, scales the individual coefficients in a zigzag scan of a DCT block as a function of the preceding coefficients. This avoids the overhead for specifying the quantizer. It exploits the coefficient masking effects where the low frequency components mask high frequency components. In wavelet applications, the coefficient masking effects result in intra-band masking, these 'bands' in DCT applications are the coefficients which have a narrow bandwidth. However, this approach has a potential problem in that the nature of the DCT and the zigzag effect do not allow accurate modeling of the masking effect.

It is now understood that the masking property of human vision primarily occurs within spatial frequency channels that are limited in radial frequency as well as orientation. This makes it possible to quantize more coarsely as a function of the activity in spatial frequency and spatial location. Nonuniform quantization can then utilize the visual masking effects instead of overtly adaptive techniques.

An advantage occurs in this approach because the masking effects are approximately the same in each channel. Once normalized, the same masking procedure can be used in each channel without incurring any overhead. An example of this technique can be found in U.S. patent application Ser. No. 09/218,937, filed Dec. 22, 1998 and co-owned by the assignee of the present invention.

One method to exploit this masking effect, hereinafter referred to as self-contrast masking effect, for image compression puts the CSF-normalized transform coefficients through a nonlinear transducer function before a uniform quantization is applied. This results in a non-uniform quantization of the original coefficients. The decoder applies the inverse process between dequantization and inverse wavelet transform. Another example of this type of technique is shown in U.S. Pat. No. 5,313,298, issued May 17, 1994, although it uses the spatial domain rather than the frequency domain.

Another method of exploiting visual masking controls individual code-block contribution. This was proposed in the JPEG2000 context in High Performance Scalable Image Compression with EBCOT, by David Taubman, submitted to *IEEE Transactions on Image Processing*, March 1999, hereinafter referred to as Taubman. This approach takes advantage of the existing JPEG2000 verification model. The approach divides the coefficients in each wavelet subband into blocks of the same size, called code-blocks. Each code-block is embedded coded independently. The embedded coding of each individual code-block does not take into account the visual masking effect.

However, in the post-compression rate-distortion optimization process of Taubman, the distortion metric takes into account the visual masking effect. In this step of the process sub-bitstreams from each code-block are assembled in a rate-distortion-optimized order to form the final bitstream. The modified metric effectively controls the bit allocation among different code-blocks, taking advantage of the visual masking effect.

The distortion of each coefficient is weighted by a visual masking factor that is generally a function of the neighboring coefficients in the same subband. This will be referred to as spatially extensive masking or neighborhood masking. It treats each coefficient value, $V_i$, as though it were equal to $V_i'$, where $$V_i' = V_i / M_i$$

and the masking strength function is $$M_i = A * \Sigma_{\{k \text{ near } i\}} sqrt(|V_k|)$$

with A being the normalization factor.

The weakness of this approach is that it only adjusts the truncation point of each code-block. This is a spatially coarser adjustment than the sample-by-sample compensation offered by the approach discussed in the U.S. patent application Ser. No. 09/218,937, mentioned previously. The bit stream order within each code-block, usually no less than 32×32, does not take into account any visual masking effect.

In the article APIC: Adaptive Perceptual Image Coding Based on Subband Decomposition with Locally Adaptive Perceptual Weighting, published in *Proceedings of the IEEE International Conference on Image Processing*, pp. 37–40, 1997, Hontsch, et al., discuss a further technique exploiting visual masking. The algorithm locally adapts the quantizer step size at each pixel according to an estimate of the masking measure presented. The estimate of the masking measure comes from the already coded pixels and predictions of the not yet coded pixels. It eliminates the overhead by exploiting the self-contrast masking based on estimates of the current pixel from the neighboring pixels already coded.

However, this estimate may not be accurate, as the coefficients are de-correlated. It also does not take advantage of spatially extensive, or neighborhood, masking.

Therefore, there is a need for a coding method that takes into account both the self-contrast masking and the neighborhood masking effects. It must take these effects into account without significantly increasing the overhead of the encoder or decoder.

SUMMARY OF THE INVENTION

One aspect of the invention is a method for compressing and decompressing image information. The method includes the steps of receiving initial image information at an encoder, and transforming the initial information using a linear transform to produce coefficients. These coefficients are then locally normalized with a neighborhood-masking factor, and then quantized and coded to produce a compressed bitstream. The compressed bitstream is decoded at a decoder using an inverse process.

An alternative embodiment applies the neighborhood masking weighting factor during encoding, after quantization, and uses self-masking-compensated coefficient prior to quanitzation. Either one of these embodiments can be combined with the contrast sensitivity function and the local luminance sensitivity of the human visual system.

BRIEF DESCRIPTION OF THE DRAWINGS

For a more complete understanding of the present invention and for further advantages thereof, reference is now made to the following Detailed Description taken in conjunction with the accompanying Drawings in which.

DETAILED DESCRIPTION OF THE PREFERRED EMBODIMENTS

Figure 1:
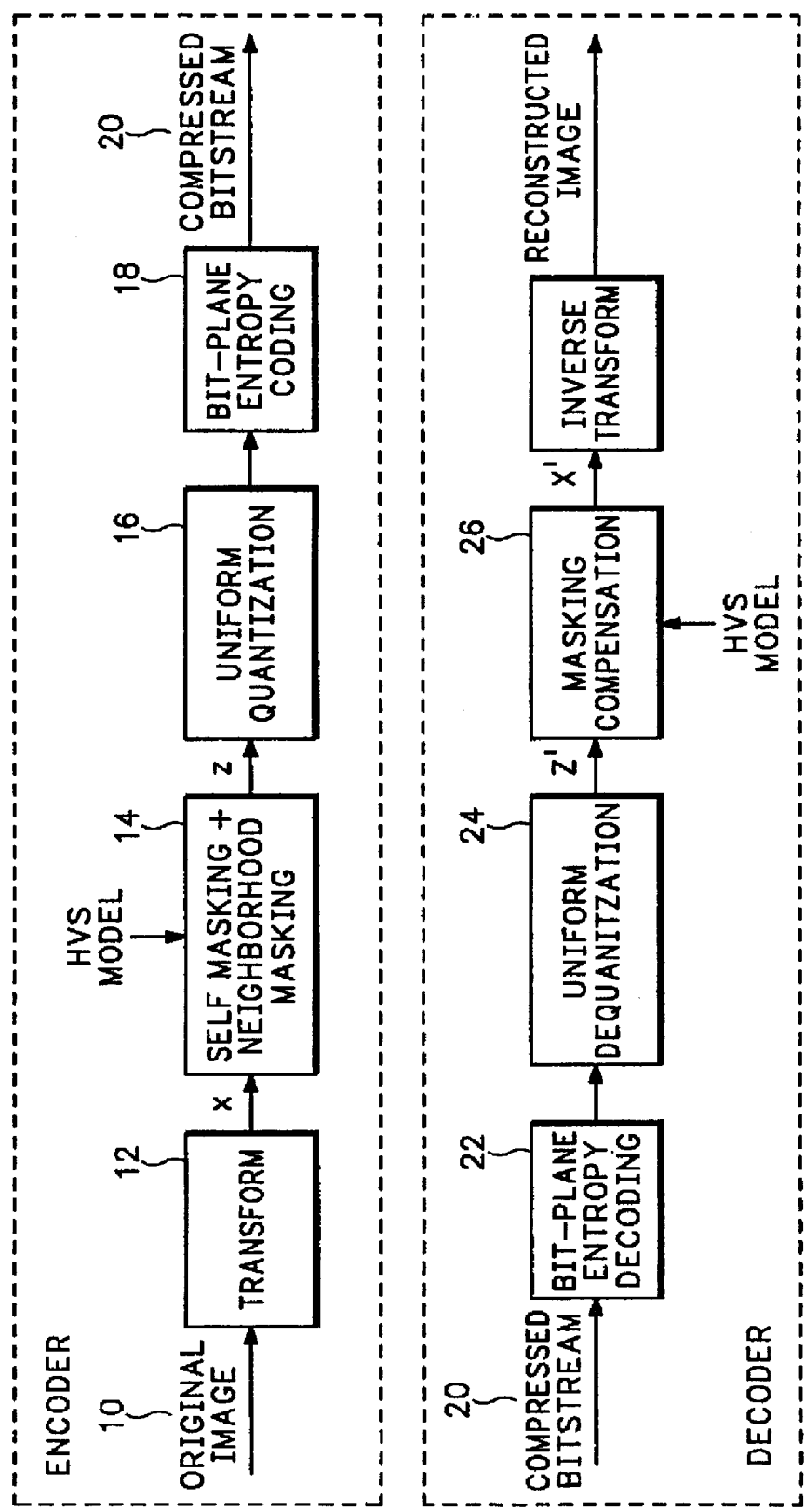
FIG. 1 shows one embodiment of an encoder and decoder process in accordance with the invention.

The masking property of human vision primarily occurs within spatial frequency channels. The approach, as described in U.S. patent application Ser. No. 09/218,937, exploits the self-contrast masking by applying a non-linear transducer function to the coefficients prior to uniform quantization. This essentially protects low amplitude coefficients, whereas the distortion introduced by more coarsely quantizing high amplitude coefficients is well masked by the coefficients themselves.

However, several problems exist with the approach for wavelet or DCT based compression systems. The first problem results from the assumption that the wavelet/DCT band structure and filters are a good match to the visual system's underlying channels, which is generally not true. Although the wavelet structure is a much better model of the visual system than the DCT, it still has a problem with the diagonal band due to the Cartesian separable approach.

In the visual system, frequencies at 45 degrees orientation have very little masking effect on those at −45 degrees, but the diagonal band has no way of distinguishing the two. This gives rise to artifacts perpendicular to the diagonal edge.

The second problem also relates to the diagonal edges. The horizontal (H) and vertical (V) bands encroach on the diagonal signals at multiples of the Nyquist/$2^L$, where L is the level of the wavelet decomposition, i.e. at 0.5, 0.25, 0.125 cycles/pixel. Diagonal edges cause high values in the H and V bands, which cause high quantization for the bands at the edges. This gives rise to horizontal and vertical artifacts along slanted edges. This problem may be helped by a different choice of filters whose Cartesian product has low energy near 45 degrees for the H and V bands. These overall problems lead to over-masking at diagonal edges. Another problem with self-contrast masking is its inability to account for masking at zero crossing coefficients within a band, i.e. phase uncertainty.

To overcome the over-masking at diagonal edges, other properties of the human visual system (HVS) must be taken into account. One of the solutions is to exploit the masking capability of a complex region, therefore allocating more bits to smooth regions or regions with simple edge structures. More specifically, a masking weighting factor can be derived for each coefficient. This factor may be derived as a function of the amplitudes of neighboring coefficients as suggested by Taubman. An advantage of this strategy lies in its ability to distinguish between large amplitude coefficients that lie in a region of simple edge structure and those in a complex region. This feature assures good visual quality of simple edges in a smooth background, often critical to the overall perceived visual quality, especially for wavelet or DCT compression.

Therefore, the present invention intends to exploit both the self-contrast masking and neighborhood masking effects of the HVS to maximize the perceived quality of the compressed images. A fixed uniform quantizer or a fixed deadzone quantizer will be assumed in the compression system, for purposes of discussion only. This is believed to be the most convenient way to lead to a quality scalability of the compressed bitstream. However, there is no limitation of applicability of the invention to other types of quantizers. With this assumption, the only way to account for the masking effect is to modify the original wavelet or DCT coefficients according to the HVS model prior to uniform quantization.

Similarly, while the below discussion assumes wavelet based compression, that is only for purposes of discussion. The invention can be applied to many transform-based coding systems, including DCT, wavelet, stearable pyramid, cortex-transform based, among others. Wavelet compression is only used to facilitate understanding of the invention.

FIG. 1 shows one embodiment of an encoder/decoder process in accordance with the invention. Initial or original image information 10 is received Eat the encoder. The initial step 12 of the process transforms the image information. by application of the appropriate transform, in this example it is the wavelet transform. This step produces wavelet transform coefficients of the image information.

In step 14, the process includes the aspects of the human visual system discussed previously. The first part of this step applies a non-linear transducer function, $f(x_i)$, to each coefficient produced in step 12. The transducer function could be one of many types. One example might be a power function where $y_i=|X_i|^\alpha$.

This step assumes each signal with which a coefficient is associated is lying on a common flat background. Under this assumption, $\{y_i\}$ are perceptually uniform. In a real image, however, this is usually not true. Each signal is superimposed on other spatially neighboring signals. There is some masking effect contributed from spatially neighboring signals due to the phase uncertainty, receptive field sizes, as well as other possible long-range spatial effects.

To further exploit the neighborhood masking effect, the second step normalizes $y_i$ by a masking weighting factor $w_i$. The factor $w_i$ is a function of $g(.)$ of the neighboring signals denoted in vector form as $N_i(\{y_k\})$, i.e. $w_i=g(N_i(\{y_k\}))$, and the normalizing equation is:

$$z_i = \frac{y_i}{w_i} = \frac{f(x_i)}{g(N_i(\{f(\hat{x}_k)\}))},$$

where $\hat{x}$ denotes the quantized version of x.

The neighboring coefficients could be in the same subband, or they could be from different frequency subbands but around the same spatial location. As mentioned previously, the second part of step 14 is especially important in wavelet/DCT-based systems or any system where over-masking may result from the first step.

For ease of discussion, the first step will be referred to as self-masking and the resulting values of $y_i$ will be referred to as self-masking-compensated coefficients. The results of the second half of the step 14 in this embodiment will be referred to as locally normalized, self-masking-compensated coefficients to indicate that they have undergone both of these processes.

It must be noted that the first part of step 14 is not necessary to practice the invention. The neighborhood masking can be applied directly to the transformed coefficients. In this instance, the function $f(x_i)=x_i$, and the resulting coefficients are referred to as locally normalized coefficients. However, for ease of discussion, the performance of both steps will be assumed.

As will be discussed in more detail later, FIG. 1 shows the implementation of one embodiment of the invention, wherein this step is performed prior to the uniform quantization step 16. As will be discussed with reference to FIG. 3, this is not necessary for implementation of the invention.

Continuing the discussion of the approach in FIG. 1, the process moves to step 16 in which the locally normalized, self-masking-compensated coefficients are quantized. In some applications, the quantization step may not be explicit, such as in embedded coding systems. The term quantization, as used in reference to this invention, covers both explicit and implicit quantization. These quantized, locally normalized self-masking-compensated coefficients are then encoded at step 18. For this example, and with no intent to limit the invention, bit-plane entropy encoding is assumed. This produces the compressed bit stream 20, suitable for transmission.

To make sure the inverse process is feasible, it is necessary to discuss interrelation between the encoder and decoder. The decoder must perform the reverse process of the encoder as shown in FIG. 1. The compressed bit stream 20 is decoded using the opposite of the encoding process at step 22, in this case bit-plane entropy decoding. The decoded stream is then dequantized at step 24, using the reverse of the quantization process in step 16. At step 26, the relationship between the encoder and decoder becomes more critical than at the other steps in the decoding process.

At the encoder, quantized versions of the neighboring coefficients that are available at the decoder will be used. The neighborhood has to be causal in the sense that each coefficient $x_k$ in this neighborhood has to be recovered before the current coefficient, $x_i$. This ensures that the decoder can perform exactly the same operation to reconstruct $w_i$. An example uses the non-linear transform $$z_i=|x_i|^\alpha/(1+a\Sigma_{\{k\,near\,i\}}|x_k|^\beta/|\phi|),$$

where z is the locally normalized, self-masking-compensated coefficient and will be subject to uniform quantization.

Figure 2:
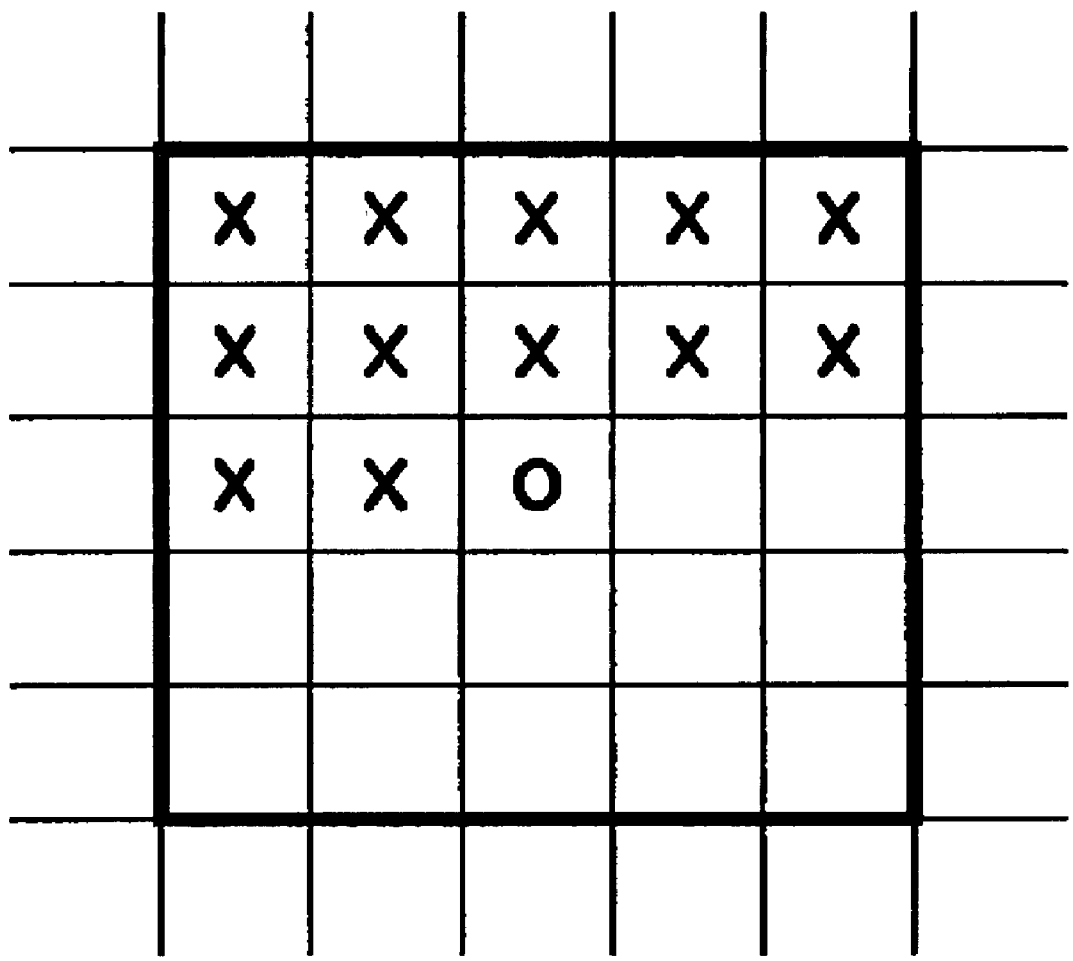
FIG. 2 shows a causal neighborhood in accordance with the invention.

In this transform, $|\phi|$ denotes the size of the causal neighborhood, a is the normalization factor and the causal neighborhood contains coefficients in the same band that lie within an NxN window centered at the coefficient and appear earlier in the raster scan order than the current coefficient. The causal neighborhood does not include the current coefficient itself in order to have an explicit solution for the inverse process. $\alpha$ is a value between 0 and 1, typically 0.7 or 0.8. $\beta$ is a positive value, and together with N and a is used to control the degree of neighborhood masking. An example of the neighborhood is shown in FIG. 2.

$\beta$ and N play important roles in differentiating coefficients around simple edges from those in the complex areas. N controls the degree of averaging, $\beta$ controls the influence of the amplitude of each coefficient. Preferably, $\beta$ is chosen to be a value of less than 1, a typical value is 0.2. This protects coefficients around simple sharp edges, as these coefficients typically have high values. A small value of $\beta$ suppresses the contribution of large coefficients around sharp edges to the masking factor.

Quantized neighboring coefficients will be used at the encoder to ensure that both the encoder and decoder perform exactly the same operation to calculate $w_i$. Using the quantized version of x, denoted by $\hat{x}$, then the equation is:

$$z_i=|x_i|^\alpha/(1+a\Sigma_{\{k-near-i\}}|\hat{x}_k|^\beta/|\phi|).$$

Unfortunately, for embedded coding the encoder cannot do the non-linear transformation based on the exact actual decompressed/quantized version of the coefficient $x_k$. This occurs because the nonlinear transform is performed prior to scalable compression and the decoder can have a bitstream that is truncated at any lower rate than the final rate.

Nevertheless, in embedded coding the discrepancy of $w_i$ calculated at the encoder and decoder can be completely eliminated or reduced by a strategy where only the same very coarsely quantized coefficients are used to calculate the masking weighting factor $w_i$ at both the encoder and the decoder. For example, after $z_i$ is quantized, the least n significant bits of the quantization index are all discarded by replacing them with zeros. This quantization index is then converted back to the x domain and is used for calculating $w_i$.

As long as n is large enough with respect to the available bit rate at the decoder, the decoder will obtain the same quantized version of the neighboring coefficients. The compromise results in a coarser granularity of $w_i$, which may affect the accuracy of the masking model slightly. Experiments have shown that the performance is not very sensitive to which quantized version of the neighboring coefficients is used.

Figure 3:
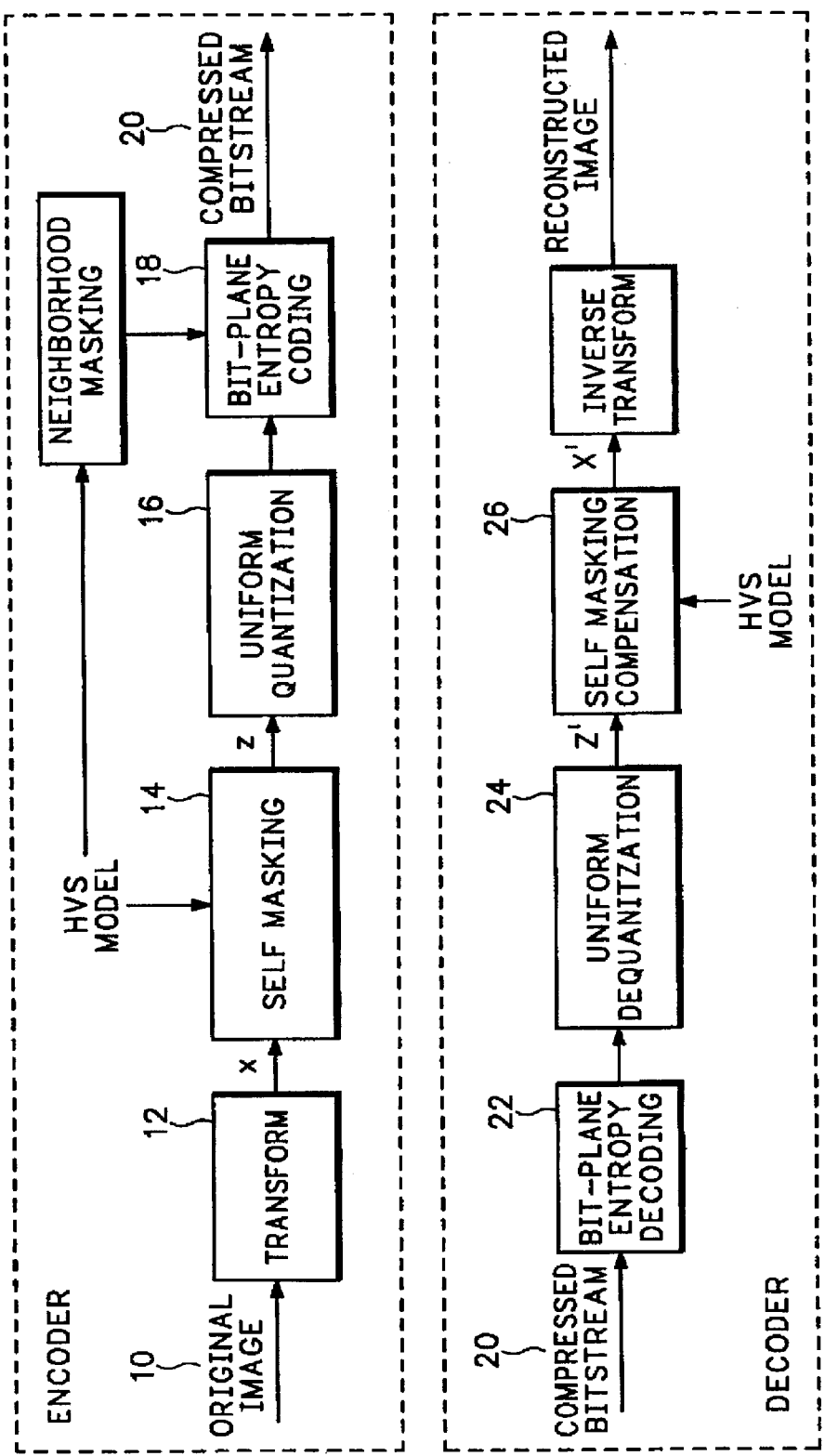
FIG. 3 shows an alternate embodiment of an encoder and decoder process in accordance with the invention.

As mentioned previously, an alternate embodiment implements the second part of visual masking differently. This embodiment is shown in FIG. 3. In this embodiment, some overhead about the local masking factor is sent to the decoder. For example, under the context of JPEG2000 verification model, a similar approach to Taubman can be used. The masking weighting is incorporated into the distortion metric for each code-block. Note that unlike the system discussed in Taubman, the uniform quantization is applied to $y_i$, not $x_i$. Both the self-contrast-masking, or self-masking, and neighborhood masking are exploited.

For example, if the same power function is applied where $y_i=|x_i|^\alpha$, the particular overall implementation for this example is $$z_i = y_i/(\Sigma_{\{k\ near\ i\}}|y_k|^\rho \Lambda \phi_i|) = |x_i|^\alpha/(\Sigma_{\{k\ near\ i\}}|x_k|^{\alpha\rho}/|\phi_i|).$$

It should be noted that the Taubman reference implements $$y_i = |x_i|/(\Sigma_{\{k\ near\ i\}}|x_k|^\rho/|\phi_i|).$$

In the above implementation, the second step is used to adjust the truncation points of each code-block. This is a coarse adjustment. Experiments have shown that application of the invention significantly improved image quality when compared to self-contrast masking approach of U.S. patent Ser. No. 09/218,937, and the neighborhood masking approach in the Taubman reference. It preserves low amplitude texture quality while maintaining good quality at sharp edges.

The invention can be combined with other properties of the HVS including local luminance sensitivity and the contrast sensitivity function (CSF). The original coefficient $x_i$ could be normalized with the CSF before it is subject to the non-linear function. Alternately, the CSF effect can be exploited by multiplying $z_i$ by a frequency-weighting factor.

The concept of neighborhood masking through a measure of local frequency activity can also be extended to DCT-based coding systems such as JPEG, MPEG and H.26x. The neighboring coefficients in these systems are the coefficients of the same bands in the neighboring blocks. In particular, the DCT coefficients of 8×8 blocks can be reorganized into a structure similar to a wavelet subband structure. Each DCT coefficient would be regarded as a local frequency component and coefficients coming from the same location in the block DCT domain can be grouped together to form a subband. This reorganization allows scalable, or bit-plane embedded, coding and the proposed visual masking scheme can be applied to these reorganized subbands.

Thus, although there has been described to this point a particular embodiment for a method and structure for coding and decoding of image information using the HVS model, it is not intended that such specific references be considered as limitations upon the scope of this invention except in-so-far as set forth in the following claims.

What is claimed is:

1. A method for compressing and decompressing image information, the method comprising:

receiving initial image information at an encoder;

transforming said initial information using a linear transform to produce coefficients;

normalizing said coefficients using a neighborhood masking weighting factor based upon averages of absolute values of neighboring coefficients raised to a predetermined power in a causal neighborhood within a moving window producing locally normalized coefficients;

quantizing said locally normalized coefficients;

coding said quantized locally normalized coefficients thereby producing a compressed bit stream;

receiving said compressed bit stream at a decoder; and applying an inverse process to reconstruct said image data from said compressed bitstream.

2. The method as claimed in claim 1 wherein said neighborhood masking weighting factor is based upon coarsely quantized neighbors.

3. The method as claimed in claim 1 wherein said method further comprises normalizing said coefficients using a contrast sensitivity function prior to normalizing using a neighborhood masking weighting factor.

4. The method as claimed in claim 1 wherein said method further comprises the step of normalizing said coefficients using local luminance sensitivity prior to normalizing using a neighborhood masking weighting factor.

5. The method as claimed in claim 1 wherein said method further comprises multiplying said locally normalized coefficients with a contrast sensitivity function weighting factor after normalizing and prior to quantizing.

6. The method as claimed in claim 1 wherein said method further comprises applying a nonlinear transducer function to create self-masking-compensated coefficients prior to normalizing.

7. A method for compressing and decompressing image information, the method comprising:

receiving initial image information at an encoder;

transforming said initial information using a linear transform to produce coefficients;

applying a nonlinear transducer function raising the coefficients to a sower having a value in the approximate range of 0 to 1 to produce self-masking-compensated coefficients;

quantizing said coefficients;

coding said self-masking-compensated quantized coefficients based upon a distortion measure weighted by a neighborhood masking factor for each code-block, thereby producing a compressed bit stream of locally normalized coefficients;

receiving said compressed bit stream at a decoder; and applying an inverse process to reconstruct said image data from said compressed bitstream.

8. The method as claimed in claim 7 wherein said method further comprises normalizing said coefficients using a contrast sensitivity function prior to applying a nonlinear transducer function.

9. The method as claimed in claim 7 wherein said method further comprises normalizing said coefficients using local luminance sensitivity prior to applying a nonlinear transducer function.

10. The method as claimed in claim 7 wherein said method further comprises multiplying said self-masking-compensated coefficients with a contrast sensitivity function weighting factor after self-masking and prior to quantizing.

* * * * *

UNITED STATES PATENT AND TRADEMARK OFFICE
CERTIFICATE OF CORRECTION

PATENT NO. : 6,658,162 B1
DATED : December 2, 2003
INVENTOR(S) : Zeng et al.

It is certified that error appears in the above-identified patent and that said Letters Patent is hereby corrected as shown below:

Column 5,
Line 12, "where $y_i = |X_i|^\alpha$." should read -- where $y_i = |x_i|^\alpha$. --.

Column 7,
Line 22, "$|y_k|^p \Lambda \phi_i|)$" should read --$|y_k|^p \wedge \phi_i|)$--.

Column 8,
Line 40, "a sower having" should read -- a power having --.

Signed and Sealed this

Twentieth Day of July, 2004

JON W. DUDAS
*Acting Director of the United States Patent and Trademark Office*